United States Patent [19]

Schmitt et al.

[11] Patent Number: 5,048,899
[45] Date of Patent: Sep. 17, 1991

[54] ANTI-SKID AND TRACTION CONTROL APPARATUS FOR A VEHICLE

[75] Inventors: Manfred Schmitt, Schwieberdingen; Norbert Rittmannsberger, Stuttgart, both of Fed. Rep. of Germany

[73] Assignee: Robert Bosch GmbH, Stuttgart, Fed. Rep. of Germany

[21] Appl. No.: 466,114

[22] Filed: Jan. 16, 1990

[30] Foreign Application Priority Data

Mar. 21, 1989 [DE] Fed. Rep. of Germany ....... 3909167

[51] Int. Cl.$^5$ .......................... B60T 8/32; B60K 28/16
[52] U.S. Cl. .................................... 303/116; 180/197; 303/110; 303/119; 303/68; 303/117
[58] Field of Search ............... 303/100, 110, 113, 116, 303/119, 93, 10-12, 117, 68; 180/197; 188/181 A, 181 R

[56] References Cited

U.S. PATENT DOCUMENTS

| | | | |
|---|---|---|---|
| 4,653,815 | 3/1987 | Agarwaz et al. | 303/100 |
| 4,657,310 | 4/1987 | Klein | 303/100 |
| 4,715,667 | 12/1987 | Otsuki et al. | 303/119 |
| 4,755,008 | 7/1988 | Imoto et al. | 303/116 |
| 4,927,213 | 5/1990 | Burgdore | 303/116 |

*Primary Examiner*—Douglas C. Butler
*Attorney, Agent, or Firm*—Edwin E. Greigg; Ronald E. Greigg

[57] ABSTRACT

A system applicable to motor vehicles having a master brake cylinder with a pressure fluid supply container and at least one pressure control valve assembly is associated with a wheel brake. A pump provided which in the anti-skid mode pumps pressure fluid drawn from the wheel brake to the master brake cylinder by use of the pressure control valve assembly. In a traction control mode, the pump draws pressure fluid from the master brake cylinder and forces it to the wheel brake. To this end, the pressure control valve assembly has a first line connection communicating with the master brake cylinder, a second line connection communicating with the wheel brake, and a third line connection through which quantities of pressure fluid flows in the anti-skid mode to reduce the wheel brake pressure. Both simple design and increased functional reliability of the system are attained by providing that in the traction control mode, the third line connection of the pressure control valve assembly communicates with a pressure outlet of the pump.

14 Claims, 3 Drawing Sheets

ANTI-SKID AND TRACTION CONTROL APPARATUS FOR A VEHICLE

BACKGROUND OF THE INVENTION

The invention is based on an apparatus for avoiding wheel locking during braking and to limit drive slip at the driven wheels of a vehicle. Such an apparatus is already known (German Offenlegungsschrift 32 15 739). For limiting drive slip or for traction control, this apparatus has an electrically controlled 3/2-way valve in the master brake line, which in the traction control mode connects not a master brake cylinder, but instead a pressure reservoir, with at least one wheel brake. The pressure of the pressure fluid contained in the reservoir can thus act on the wheel brake, which is triggered by means of a pressure control valve assembly. If there is inadequate pressure in the reservoir, which is detected by means of a pressure switch, the pump, which has one pumping direction, is switched on. Via a pressure-controlled switchover valve, the pump, draws pressure fluid from the pressure fluid supply container of the master brake cylinder and pumps the pressure fluid to the pressure reservoir. A check valve connected parallel to the 3/2-way valve and having a pressure limiting spring is also provided, to protect the wheel brake, pressure control valve assembly, 3/2-way valve and pump from overloading. The known apparatus is not only relatively expensively embodied, but because the valves are connected serially between the master brake cylinder of the wheel brakes it has limited functional reliability.

OBJECT AND SUMMARY OF THE INVENTION

The apparatus according to the invention has an advantage over the prior art of a simple design, because for the traction control mode, the only provisions needed are to make the pump pressure effected at a third connection of the pressure control valve assembly. Increased functional reliability in braking operation is attained, because all that is located between a wheel brake and the master brake cylinder is the pressure control valve assembly.

Advantageous further features and improvements of the apparatus defined herein are attainable with the provisions set forth.

Some provision are advantageous in that a function of the apparatus necessary for traction control can be tripped merely by using a pump having two pumping directions. As a result, the pressure control valve assemblies already needed for the anti-skid mode are sufficient. The costs for attaining the expanded pump function are low.

A pump as defined herein is suitably used.

An embodiment of the apparatus defined is advantageous, because a pump can be used that needs to be driven in only one rotational direction.

An embodiment of the apparatus disclosed has an advantage that by using a pump that pumps in only one direction and is therefore simple to embody, a switchover of pressure fluid flow paths necessary for both operating states of the apparatus is attainable at low expense for the valves.

Suitably, valve assemblies are used as defined herein.

In a generic apparatus, for rapid pressure reduction at at least one wheel brake, one check valve per wheel brake can be provided which is connected parallel to the pressure control valve assembly and has a blocking action from the master brake cylinder to the wheel brake. The function of these check valves can be assured at low expense, even with an apparatus having a pump that pumps in only one direction and having a switchover valve assembly, by using the provision set forth.

By comparison, a further feature of the invention defined herein simplifies the valve design and thus increases the functional reliability of the apparatus.

With some provision set forth, the pump and the valves of the apparatus are protected against a pressure overload.

A cost-effective embodiment for the switchover valve assembly is defined herein.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
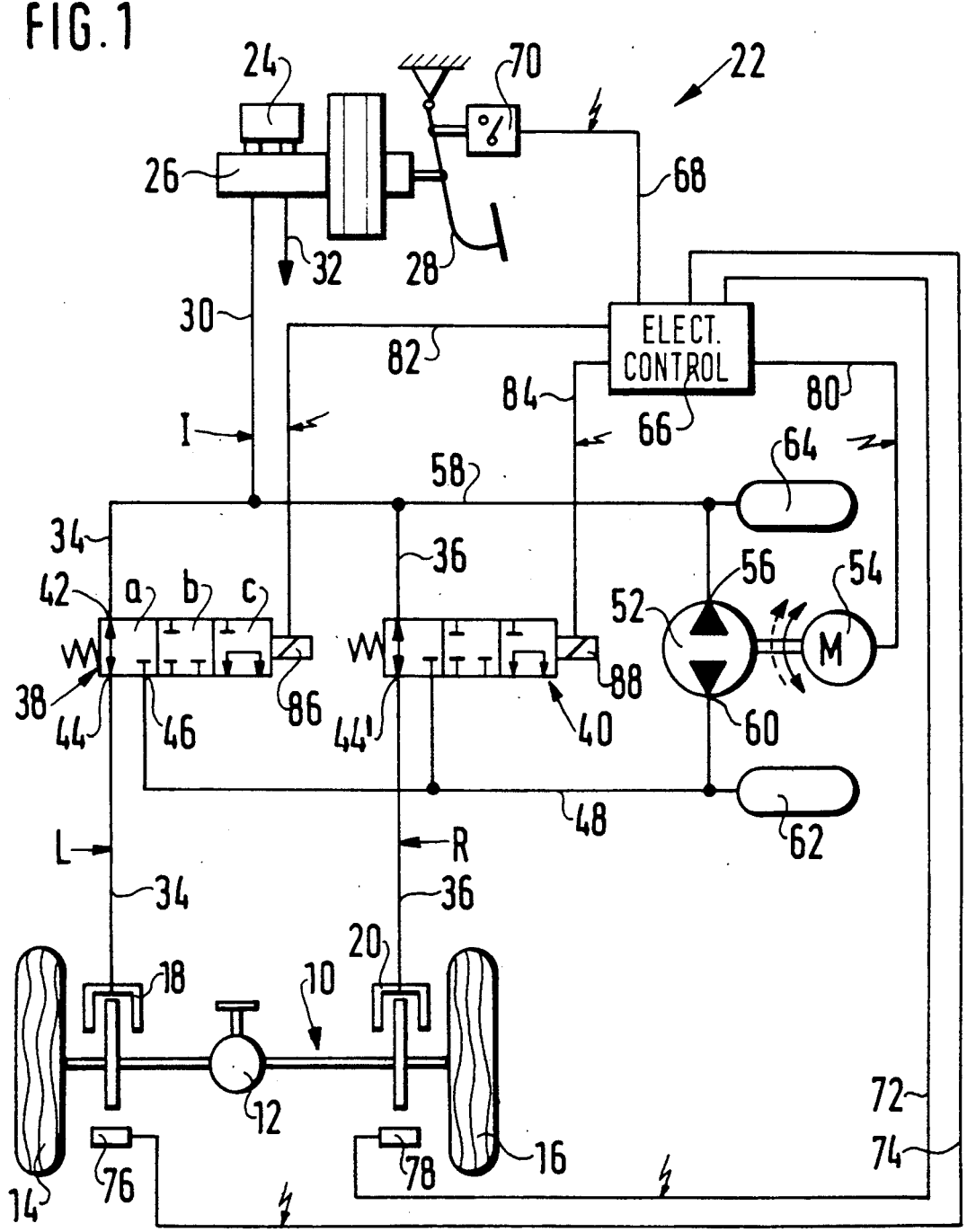
FIG. 1 shows a driven pair of wheels with a system for wheel locking in braking and to limit drive slip, which has a pressure fluid pump pumping in two directions, as a first exemplary embodiment.

In the first exemplary embodiment of FIG. 1, a drive axle 10 of a vehicle, not otherwise shown, has two wheels 14 and 16 drivable via a differential transmission 12 and to each of which one wheel brake 18 and 20 is assigned to each wheel. The vehicle is equipped with an anti-skid and traction control system 22 to avoid wheel locking in braking and to limit drive slip at the wheels 14 and 16. In this system 22, a master brake cylinder 26 is equipped with a pressure fluid supply container 24 and actuatable with a brake pedal 28. A brake circuit I is connected to the master brake cylinder 26 by a master brake line 30 for actuating the wheel brakes 18 and 20. The master brake cylinder 26 is also connected to a second master brake line 32 for a brake circuit II, not shown, that includes wheel brakes of a further axle of the vehicle, not shown.

The master brake line 30 is divided into one wheel brake line 34 to form a control channel L for the left wheel 14 of the drive axle 10 and a wheel brake line 36 to form a control channel R for the wheel brake 20 of the right wheel 16. A pressure control valve assembly 38 in the form of a 3/2-way valve is disposed in the wheel brake line 34 between the master brake cylinder 26 and the wheel brake 18. A corresponding identical pressure control valve assembly 40 is connected to the wheel brake line 3 of the control channel R.

The multi-position valve of the pressure control valve assembly 3 has three connections: A first connection 42 is connected to the master brake cylinder 26 via line 30; a second connection 44 is connected to the wheel brake 18 in the control channel L, while a third connection 46 communicates with a pump connection line 48. The multi-position valve of the pressure control valve assembly 38 can assume three switching positions: in the spring-actuated basic position a, the valve is open between the connections 42 and 44, while the connection 46 is blocked. In the electromagnetically switched position b, all three connections 42, 44 and 46 are blocked. In the likewise electromagnetically actuated position c of the valve, the passage is open between the connections 44 and 46 back to the pump 52, while the connection 42 is blocked. The pressure control valve assembly 40 is switched correspondingly, but with the difference that the second connection 44' of the valve is connected to the wheel brake 20 in the control channel R.

The system 22 also has a self-aspirating pump 52 with an electric drive motor 54. By reversing the direction of rotation of the drive motor 54 (double arrow shown in solid lines), the pump 52 embodied as a gear pump can be switched back and forth in two pumping directions. Deviating from this, the pump 52 of FIG. 1 may be provided with a drive at a constant direction of rotation (arrow shown in dashed lines) and may have two pumping directions that can be switched over under the control of valves on the inside of the pump. The pump 52 communicates by one connection 56 with a pump line 58 that is connected to the wheel brake lines 34 and 36 toward the master brake cylinder. The other connection 60 of the pump 52 communicates with the aforementioned pump line 48. A pressure fluid reservoir 62 is also connected to the line 48, and a damper 64 is also connected to the line 58.

The system 22 is also equipped with an electronic control unit 66. Connected to the control unit 66 is an electrical conductor line 68 having a recognition switch 70, which cooperates with and is controlled by the brake pedal 28. Further electrical conductor lines 72 and 74 of the control unit 66 lead to rpm sensors 76 and 78, with which the rotational behavior of the wheels 14 and 16 can be detected. Also connected to the control unit 66 is an electrical conductor line 80 for switching the drive motor 54 of the pump 52. Electrical conductor lines 82 and 84 lead to actuating magnets 86 and 88 of the two pressure control valve assemblies 38 and 40, respectively.

The mode of operation of the system 22 is as follows:

In position a, shown, of the pressure control valve assembly 38, by actuating of the brake pedal 28, brake pressure is generated in the wheel brake 18 of the wheel 14 beginning at the master brake cylinder 26 and proceeding via the master brake line 30 and the wheel brake line 34. Brake pressure in the wheel brake 20 of the wheel 16 is made operative in a corresponding manner via lines 30 and 36.

In brake regulation to avoid locking of the wheel 14, for instance, during braking, brake pressure is likewise transferred from the master brake cylinder 26 to the wheel brake 18 in this position a of the pressure control valve assembly 38. In position b, contrarily, the passage from the master brake cylinder 26 to the wheel brake 18 is interrupted, so the brake pressure at the wheel 14 remains constant. In position c, the wheel brake 18 is made to communicate with the line 48, so that the brake pressure in the wheel brake drops.

In anti-skid operation, the rotational behavior of the wheel 14, for example, is detected with the rpm sensor 76 and a signal produced by rpm sensor 76 is evaluated by the electronic control unit 66. If there is a threat of wheel locking, the control unit 66 switches the pressure control valve assembly 38 to its position c, so that brake pressure fluid flows out of the wheel brake 18 via the lines 34 and 48 to the pressure fluid reservoir 62 to reduce the brake pressure at the wheel 14. At the same time, the control unit 66 switches on the drive motor 54 of the pump 52, so that the pump pumps the pressure fluid taken from the wheel brake 18 back to the master brake cylinder 26, via the line 58 and the master brake line 30.

In the course of the brake regulation in anti-skid operation, in position of the pressure control valve assembly 38 switched by the control unit 66, pressure fluid is drawn from the reservoir 62 and pumped by the pump 52 through the line 58 and the wheel brake line 34 to the wheel brake 18 to build up the brake pressure.

In operation of the system 22 for limiting drive slip, for instance of the wheel 14, the position of the (non-actuated) brake pedal 28 is detected by means of the switch 70, and the drive motor 54 of the pump 52 is switched on in the reverse direction of rotation from that of anti-skid operation. In addition, the control unit 66 moves the pressure control valve assembly 38 into its position In this operating state, the pump aspirates pressure fluid from the supply container 24 through the master brake cylinder 26 and through the lines 30 and 58 and forces it through the lines 48 and 34 into the wheel brake 18. In this process the pressure fluid flows into the third connection 46 of the pressure control valve assembly 38 and through the second connection 44 to the wheel brake 18. By suitable control of the pressure control valve assembly 38 by means of the control unit 66, the brake pressure then becomes effective in the wheel brake 18 at a level that prevents the wheel 14 from slipping excessively.

To cancel this traction control mode, the control unit 66 switches the pressure control valve assembly 38 into position a. At the same time, the drive motor 54 of the pump 52 is switched off by the control unit 66. As a result, the pressure fluid can flow out of the wheel brake 18 through the lines 34 and 30 back to the supply container 24 of the master brake cylinder 26.

In the following exemplary embodiments, the same reference numerals as before are used for identical components and groups of components.

Figure 2:
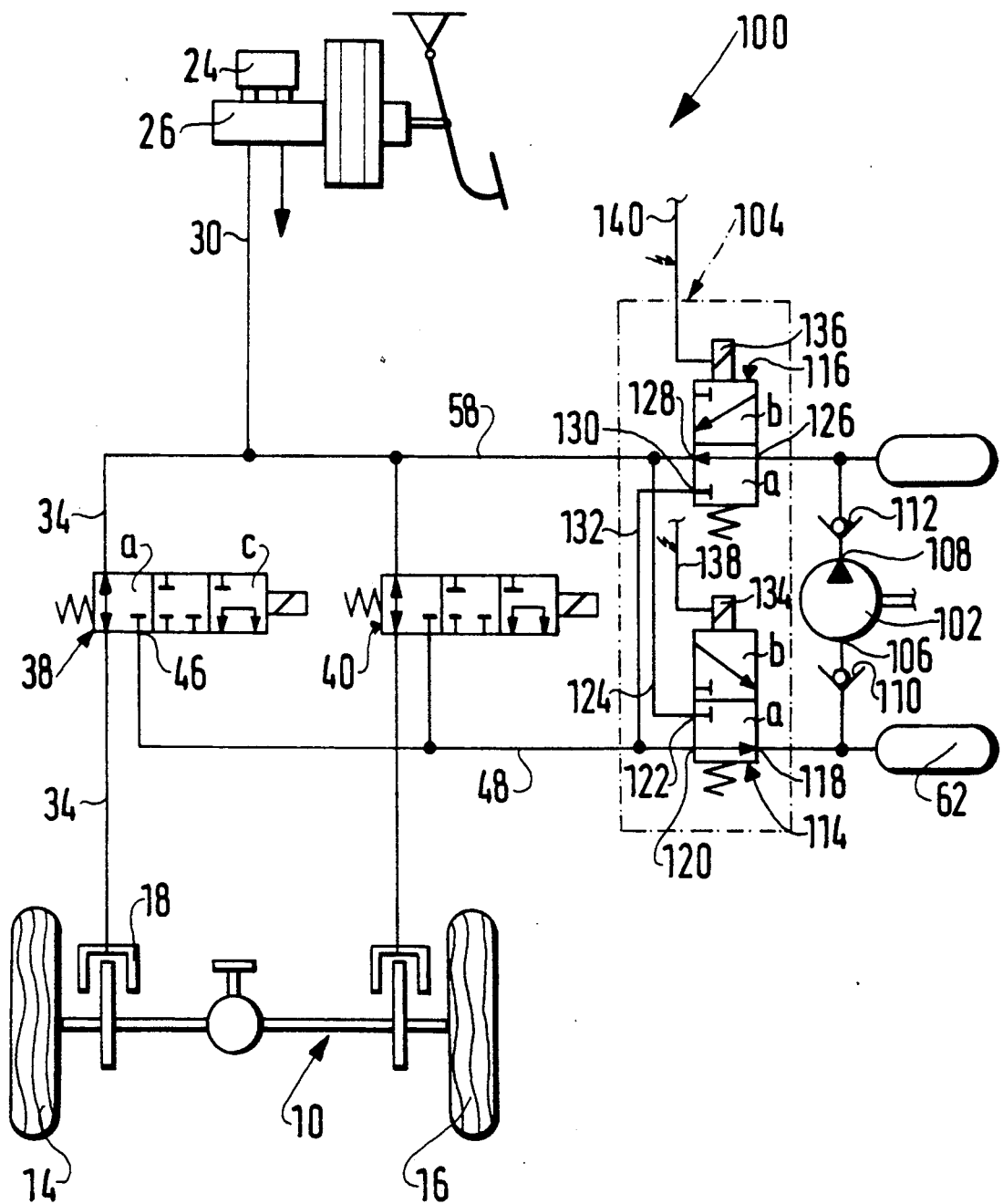
FIG. 2 shows a system having a pump pumping in only one direction, and to which a switchover valve assembly is assigned, as the second exemplary embodiment.

In the second exemplary embodiment shown in FIG. 2, the system 100 for avoiding wheel locking during braking and for limiting drive slip at the driven wheels 14 and 16 of the drive axle 10 differs from that of the example of FIG. 1 substantially in that a pump 102 having only one pumping direction and a switchover valve assembly 104 associated with the pump are provided. The pump 102, which for instance can be of a kind known in the prior art, is connected at its pressure fluid inlet 106 to the pump line 48. The pressure fluid outlet 108 of the pump 102 communicates with the pump line 58 via a control valve 116. One one-way check valve each 110 and 112 is located in the line 48, upstream of the pump inlet 106, and in the line 58 downstream of the pump outlet 108, respectively.

The switchover valve assembly 104 comprises one 3/2-way- valve 114 and 116 each, disposed on the inlet side of the pump 102 in the line 48 and on the outlet side of the pump in the line 58, respectively. The multi-position valve 114 has three fluid flow line connections: a first line connection 118 communicating with the pump inlet 106; a second line connection 120 communicating with the pump line 48; and a third line connection 122, from which a switchover line 124 leads to the pump line 58. In the spring-actuated basic position of the valve 114, there is an open passage between the second line connection 120 and the first line connection 118, while the third connection is blocked. In its electromagnetically actuated position b, there is an open fluid flow passage between the third line connection 122 and the first line connection 118. The second line connection 120 is blocked.

The multi-position valve 116 of the switchover valve assembly 104 disposed on the outlet side of the pump 102 likewise has three flow line connections. The first line connection 126 communicates with the pump outlet 108; the second line connection 128 communicates with the pump line 58; and the third line connection 130 communicates with a switchover line 132 leading to the pump line 48. In the spring-actuated basic position a of the valve 116, there is an open fluid flow passage between the first line connection 126 and the second line connection 128. The third line connection 130 is blocked. In the electromagnetically actuated position b of the valve 116, the second line connection 128 is blocked, while there is an open passage between the first line connection 126 and the third line connection 130

Otherwise, the system 100 is equipped identically to that of FIG. 1. It also has an electronic control unit, not shown, to which the actuating magnets 134 and 136 of the two valves 114 and 116 are connected by electrical conductor lines 138 and 140.

The pressure control valve assemblies 38, 40 of the system 100 are electrically connected to the electronic control unit and operate in the same manner as in the first exemplary embodiment.

In the anti-skid mode, in which there is a danger of locking of the wheel 14, for example, and the pressure control valve assembly 38 is switched to valve position c, the pump 102 pumps pressure fluid from the third connection 46 of the pressure control valve assembly 38 through the line 48 to reduce the pressure in the wheel brake 18, and with multi-position valves 114 and 116 of the switchover valve assembly 104 located in their basic position a, the pump pumps pressure fluid through the line 58 to the master brake cylinder 26. For pressure buildup in the wheel brake 18, the pressure control valve assembly 38 assumes the basic position ^ a ^. In this operating condition, the pump 102 pumps pressure fluid from the reservoir 62 through the line 58 and the wheel brake line 34 to the wheel brake 18.

In the traction control mode, in which the wheel 14 is for instance to be prevented from spinning, the pressure control valve 38, because of the triggering of the system 100 by the control unit, not shown, assumes the position c, while the valves 114 and 116 of the switchover valve assembly 104 are switched into their position b. For pressure buildup in the wheel brake 18, the pump 102 draws pressure fluid from the supply container 24 via the third line connection 122, which communicates by the line 124 and the line 58 with the master brake cylinder 26. The pump 102 pumps the pressure fluid via the first line connection 126 of the multi-position valve 116 to its third line connection 130, which via the switchover line 132 communicates with the line 48 that is connected to the third line connection 46 of the pressure control valve assembly 38. For pressure reduction in the wheel brake 18, the pressure control valve assembly 38 is switched to its basic position a: the pressure fluid can flow through the wheel brake line 34 and the master brake line 30 back to the pressure fluid supply container 24 of the master brake cylinder 26.

Figure 3:
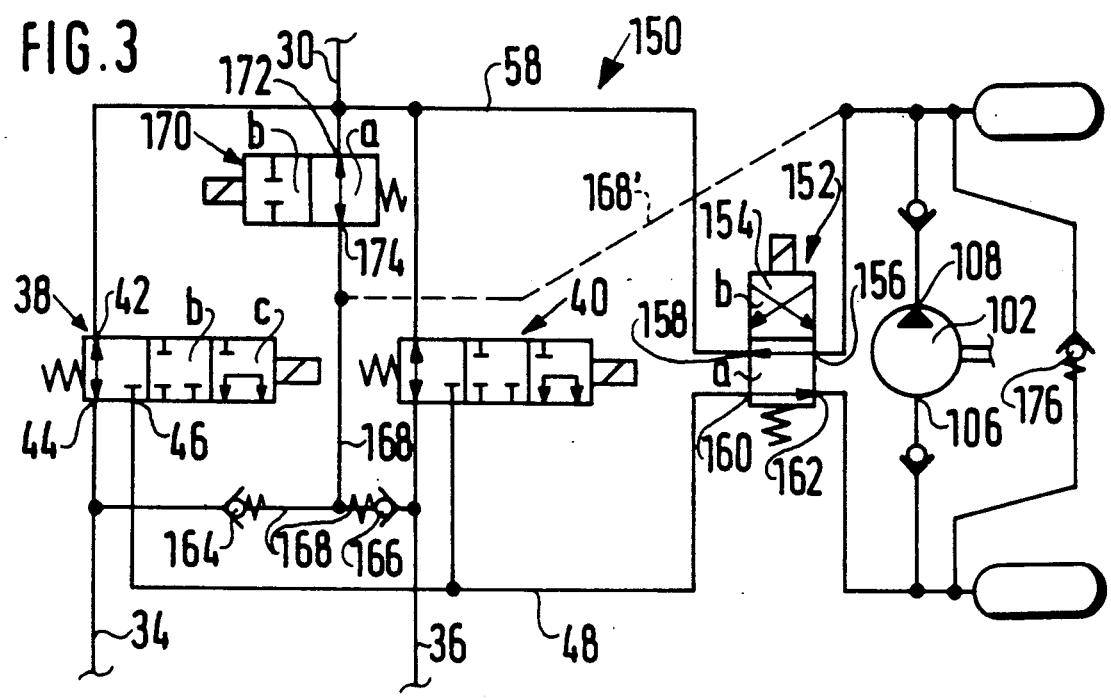
FIG. 3 shows a detail of a wiring diagram of FIG. 2, with a differently embodied switchover valve assembly and with controlled check valves, as a third exemplary embodiment.

The assembly 150 shown in detail in FIG. 3 as a third exemplary embodiment, for avoiding wheel locking in braking and for limiting drive slip, differs from the exemplary embodiment of FIG. 2 described substantially in that the switchover valve 104, including the switchover lines 124 and 132, is replaced with a valve assembly 152, Which comprises a 4/2-way valve 154. This valve has four line connections: The first line connection 156 communicates with the pump outlet 108; the second line connection 158 communicates via the pump line 58 and the master brake line 30 with the master brake cylinder, not visible in FIG. 3; the third connection 160 communicates via the line 48 with the third line connection 46 of the two pressure control valve assemblies 38 and 40; and the fourth line connection 162 communicates with the pump inlet 106. The multi-position valve 154 has a spring-actuated position of repose a, in which there is an open fluid flow passage both between the first line connection 156 and the second line connection 158 and between the third line connection 160 and the fourth line connection 162. In a second position b of the multi-position valve, switched by the control unit, not shown, of the apparatus 150, there is an open fluid flow passage between the first line connection 156 and the third line connection 160, and between the second line connection 158 and the fourth line connection 162. Pumping of pressure fluid by the pump 102 is effected in the same manner as in the exemplary embodiment of FIG. 2, both in anti-skid operation and in the traction control mode.

To increase the functional reliability of the apparatus 150, it is advantageous to assign the pressure control valve assemblies 38 and 40 a respective one-way check valve 164 and 166, between each first line connection 42 and second line connection 44. The check valves 164 and 166 are therefore located in a return line 168 connected on the one hand to the respective wheel brake line 34 or 36 and on the other to the master brake line 30. The check valves 164 and 166 develop a blocking action from the master brake cylinder 26 with respect to the applicable wheel brake 18 or 20, and if the pressure control valve assemblies 38, 40 should stick, particularly in their positions b they allow terminating braking upon release of, the brake pedal 28.

In the traction control mode, the pressure control valve assemblies 38 and/or 40 can be switched into their position c and the switchover valve assembly 152 can be switched into its position b. During pressure buildup, to prevent an escape of pressure fluid from the second line connection 44 of the pressure control valve assemblies 38 and 40 through the return line 168 and the one-way check valves 164 and 166 to the master brake cylinder 26 or through the line 58 back to the pump 102, a 2/2-way valve 170 is incorporated in the return line 168 in series with the one-way check valves 164 and 166. This valve 170 has a first line connection 172, which communicates with the master brake line 30, while a second connection 174 communicates with the check valves 164 and 166. In a first switching position a of the valve 170, line connections 172 and 174 are switched to be open. In the second position which can be switched by electromagnetic actuation of the apparatus 150 by the control unit, not shown, the line connections 172 and 174 are contrarily blocked. For the sake of rapid pressure reduction in normal braking operation, the multi-position valve 170 assumes the basic position ^ a ^, while contrarily in the traction control mode the multi-position valve 170 is switched to its position ^ b ^. Otherwise, the apparatus 150 is equipped identically to the two exemplary embodiments described above.

However, the multi-position valve 170 may be omitted, if the return line 168 is connected not to the master brake line 30 but rather between the pump outlet 108 of the pump 102 and the multi-position valve 154 (line 168' shown in dashed lines in FIG. 3).

In the case of a pump 102 embodied so that it does not self-limit its pressure, a one-way pressure limiting valve 176 connected parallel to the pump is additionally necessary; in switching positions of the pressure control valve assemblies 38, 40, in which a flow of pressure fluid from the pump is suppressed, this pressure limiting valve 176 prevents an increase in the pressure beyond a maximum allowable value.

Figure 4:
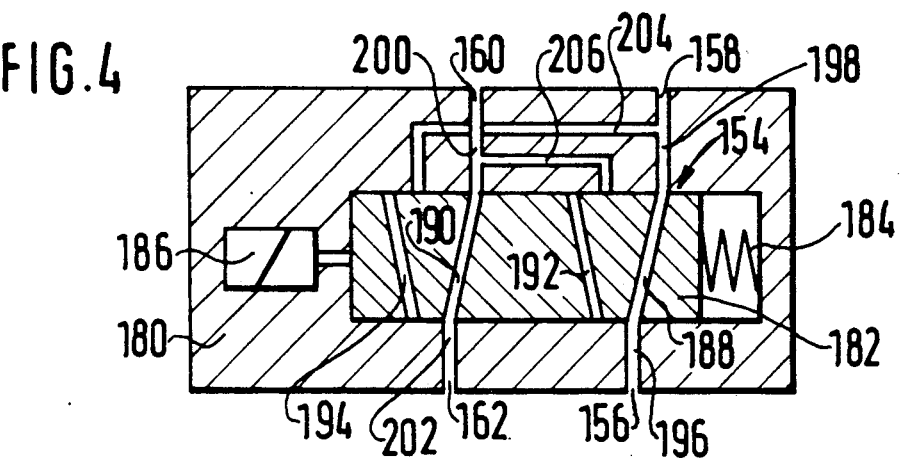
FIG. 4 is a schematic illustration of the switchover valve assembly of FIG. 3 embodied in the manner of a longitudinal slide.

In FIG. 4, an exemplary embodiment of the operative structure for the 4/2-way valve 154 of the switchover valve assembly 152 of the exemplary embodiment of FIG. 3 is shown. The valve has a housing 180 with a longitudinally guided slide 182. The longitudinal slide 182 is movable into its position a shown by a return spring 184. An electromagnet 186 serves to move the longitudinal slide 182 into its position b. The longitudinal slide 182 is provided with four control conduits 188, 190, 192 and 194. The valve housing 180 has four line connections 156, 158, 160 and 162, as well as associated connection conduits 196, 198, 200 and 202. In position a, shown, of the valve assembly 152, the first line connection 156 and the second line connection 158 communicate through the connecting conduit 196 and 198 of the valve housing 180 and through the control conduit 188 in the longitudinal slide 182. In a corresponding manner, there is an open passage between the third line connection 160 and the fourth line connection 162 by means of the control conduit 190 and the connecting conduits 200 and 202. The valve housing 180 also has housing conduits 204 and 206 associated with the second line connection 158 and the third line connection 160; of these conduits, the conduit 204 communicates with the connecting conduit 198 and the conduit 206 communicates with the connection conduit 200. In the electromagnetically actuated position b of the 4/2-way valve 154, the first connection 156 therefore communicates with the third line connection 160 via the connecting conduit 196, the control conduit 192, the housing conduit 206 and the connecting conduit 200. Correspondingly, communication exists between the second line connection 158 and the fourth line connection 162 via the connecting conduit 198, the housing conduit 204, the control conduit 194 and the connecting conduit 202.

Figure 5:
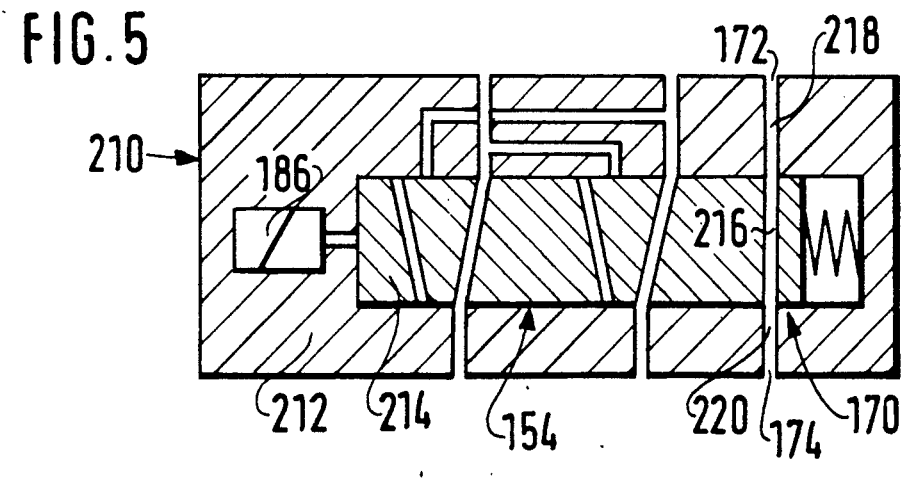
FIG. 5 shows a switchover valve assembly of FIG. 4, expanded by a further valve, in a similar view to FIG. 4.

In the exemplary embodiment shown in FIG. 5 of a switchover valve assembly 210, the 4/2-way valve 154 of the switchover valve assembly 152 of the exemplary embodiment of FIG. 3 is combined with the 2/2-way valve 170 connected in series with the one-way check valves 164 and 166, in a valve housing 212 likewise having a longitudinal slide 214. The 4/2-way valve 154 is embodied identically to the exemplary embodiment of FIG. 4. To illustrate the 2/2-way valve 170, the longitudinal slide 214, actuatable with an electromagnet 186, is lengthened and provided with an additional control conduit 216. The valve housing 212 also has an additional two connecting conduits 218 and 220, of which the connecting conduit 218 communicates with the first line connection 172 and the connecting conduit 220 communicates with the second line connection 174 of the multi-position valve 170. In the basic position a shown of the 4/2-way valve 154, the 2/2-way valve 170 assumes its basic position a as well, in which the first line connection 172 communicates with the second line connection 174 via the connecting conduit 218, the control conduit 216 and the connecting conduit 220. In the position b of the 4/2-way valve 154, the multi-position valve 170 assumes its position b as well, in which the passage between the connections 172 and 174 is blocked.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United State is:

1. An anti-skid and traction control system (100) for avoiding wheel locking in a vehicle having drivable wheels (14, 16) for braking and to limit drive slip at the drivable wheels (14, 16) of the vehicle, which comprises at least a single-circuit master brake cylinder (26) with a pressure fluid supply container (24), having pressure control valve assemblies disposed between the master brake cylinder (26) and wheel brakes (18) of drivable wheels (14) and (16), and having a pump (102) rotatable in only one direction and including a pressure fluid inlet (106) and a pressure fluid outlet (108), and is provided with a switchover valve assembly (104, 152) which in an anti-skid mode connects the pressure fluid outlet (108) of the pump (102) with the master brake cylinder (26) and connects the pressure fluid inlet (106) with the third line connection (46) of at least one pressure control valve assembly (38), while in the traction control mode the pressure fluid inlet (106) of the pump (102) communicates with the master brake cylinder (26) and the pressure fluid outlet (108) communicates with the third line connection (46) of the pressure control valve assembly (38), said pressure control valve assembly (38) has a first line connection (42) communicating with the master brake cylinder (26), a second line connection (44) communicating with the wheel brake (18) and a third line connection (46), through which quantities of pressure fluid flow in the anti-skid mode for reducing the wheel brake pressure, in the traction mode said third line connection (46) of the pressure control valve assembly (38) communicates with a pressure outlet connection (108) of the pump (102).

2. An apparatus as defined by claim 1, in which said pump (102) is a gear pump.

3. An apparatus as defined by claim 1, in which said pump (102) has a drive means (54) of constant direction of rotation and two pumping directions reversible under valve control.

4. An apparatus as defined by claim 1, in which said switchover valve assembly (104) comprises one 3/2-way valve (114, 116) disposed on each the inlet side and the outlet side of the pump (102), respectively, wherein the inlet-side valve (114) has a first line connection (118)

communicating with the pump (102), a second line connection (120) communicating with the third line connection (46) of the pressure control valve assembly (38), and a third line connection (122) communicating with the master brake cylinder (26), while the outlet-side valve (116) is provided with a first line connection (126) communicating with the pump (102), a second line connection (128) communicating with the master brake cylinder (26), and a third connection (130) communicating with the third line connection (46) of the pressure control valve assembly (38).

5. An apparatus as defined by claim 4, having a check valve (164) disposed parallel to the pressure control valve assembly (38) between its first and second line connections (42, 44) and having a blocking action from the master brake cylinder (26) to the wheel brake (18), and a 2/2-way valve (170) connected to series with check valve (164).

6. An apparatus as defined by claim 5, in which said 2/2-way valve (170) connected in series with the check valve (164) is combined with the switchover valve assembly (152) to form a valve assembly (212, 214) of a longitudinal slide type having an electromagnet (186).

7. An apparatus as defined by claim 1, in which said switchover valve assembly (152) comprises a 4/2-way valve (154), of which a first line connection (156) communicates with the outlet (108) of the pump (102), a second line connection (158) communicates with the master brake cylinder (26), the third line connection (160) communicates with the third connection (46) of the pressure control valve assembly (38), and a fourth line connection (162) communicates with the pump inlet (106), wherein in one position the switchover valve assembly (152) connects the pump outlet (108) with the master brake cylinder (26) and connects the third line connection (46) of the pressure control valve assembly (38) with the pump inlet (106), and in its other position connects the pump outlet (108) with the third line connection (46) of the pressure control valve assembly (38) and connects the master brake cylinder (26) with the pump inlet (106).

8. An apparatus as defined by claim 7, having a check valve (164) disposed parallel to the pressure control valve assembly (38) between its first and second line connections (42, 44) and having a blocking action from the master brake cylinder (26) to the wheel brake (18), and a 2/2-way valve (170) connected in series with check valve (164).

9. An apparatus as defined by claim 8, in which said 2/2-way valve (170) connected in series with the check valve (164) is combined with the switchover valve assembly (152) to form a valve assembly (212, 214) of a longitudinal slide type having an electromagnet (186).

10. An apparatus as defined by claim 7, having a check valve (164) for terminating braking of the wheel brake (18), which check valve performs a blocking action from the master brake cylinder (26) to the wheel brakes (18) and is located in a return line (168, 168') connected to the wheel brake line (34) between the pressure control valve assembly (38) and the wheel brake (18), and is connected between a 4/2-way valve (154) and the pump outlet (108).

11. An apparatus as defined by claim 7, having a pump (102) that does not selflimit its pressure, which includes a pressure limiting valve (176) connected between the pump inlet (106) and the pump outlet (108).

12. An apparatus as defined by claim 7, in which said 4/2-way valve (154) of the switchover valve assembly (152) is of a longitudinal slide type.

13. An apparatus as defined by claim 1, having a check valve (164) for terminating braking of the wheel brake (18), which check valve performs a blocking action from the master brake cylinder (26) to the wheel brakes (18) and is located in a return line (168, 168') connected to the wheel brake line (34) between the pressure control valve assembly (38) and the wheel brake (18), and is connected between a 4/2-way valve (154) and the pump outlet (108).

14. An apparatus as defined by claim 1, having a pump (102) that does not selflimit its pressure, which includes a pressure limiting valve (176) connected between the pump inlet (106) and the pump outlet (108).

* * * * *